United States Patent [19]

Lo

[11] Patent Number: 4,774,111
[45] Date of Patent: Sep. 27, 1988

[54] HEAT-CURABLE SILICONE COMPOSITIONS COMPRISING FUMARATE CURE-CONTROL ADDITIVE AND USE THEREOF

[75] Inventor: Peter Y. K. Lo, Midland, Mich.

[73] Assignee: Dow Corning Corporation, Midland, Mich.

[21] Appl. No.: 67,747

[22] Filed: Jun. 29, 1987

[51] Int. Cl.$^4$ ............................................. B05D 3/02
[52] U.S. Cl. ................................. 427/387; 427/407.1; 427/411; 428/447; 528/15; 528/31; 528/32; 525/478; 525/479
[58] Field of Search ............... 427/407.1, 411, 387; 528/31, 32, 15; 428/447; 525/478, 479

[56] References Cited

U.S. PATENT DOCUMENTS

| | | | |
|---|---|---|---|
| 3,445,420 | 5/1969 | Kookootsedes | 260/37 |
| 3,759,968 | 9/1973 | Berger et al. | 260/448.20 |
| 3,882,083 | 5/1975 | Berger et al. | 260/46.5 UA |
| 3,989,667 | 11/1976 | Lee et al. | 260/46.5 UA |
| 4,208,471 | 6/1980 | Bresak et al. | 528/27 |
| 4,256,870 | 3/1981 | Eckberg | 528/15 |
| 4,337,332 | 6/1982 | Melancon et al. | 528/15 |
| 4,465,818 | 8/1984 | Shirahata et al. | 528/12 |
| 4,472,563 | 9/1984 | Chandra et al. | 528/15 |
| 4,562,096 | 12/1985 | Lo et al. | 427/208.8 |
| 4,609,574 | 9/1986 | Keryk et al. | 427/407.1 |

*Primary Examiner*—Melvyn I. Marquis
*Attorney, Agent, or Firm*—George A. Grindahl

[57] ABSTRACT

Compositions which cure by a platinum-catalyzed reaction between silicon-bonded hydrogen atoms and silicon-bonded, aliphatically unsaturated hydrocarbon radicals have improved pot-life and cure-rate characteristics when a catalyst-inhibiting amount of a diorgano fumarate compound is added to the composition. Solventless coating compositions containing a dialkyl fumarate, a methylhydrogenpolysiloxane and a methylpolysiloxane bearing hexenyl radicals are particularly useful as adhesive-release coatings for acrylic-based pressure sensitive adhesives, applied in-line.

9 Claims, No Drawings

HEAT-CURABLE SILICONE COMPOSITIONS COMPRISING FUMARATE CURE-CONTROL ADDITIVE AND USE THEREOF

BACKGROUND OF THE INVENTION

The present invention relates generally to heat-curable silicon-containing compositions. More specifically, this invention relates to compositions which cure by way of a platinum-catalyzed reaction of silicon-bonded olefinic hydrocarbon radicals with silicon-bonded hydrogen atoms, wherein the room temperature catalytic activity of the platinum-containing catalyst has been inhibited by the presence of an inhibitor component whose inhibiting action can be overcome by heating.

Organosilicon compositions in which a platinum-containing catalyst is inhibited in its cure-promoting activity at room temperature by the presence of a catalyst inhibitor are well known in the organosilicon art. Examples of compositions having platinum catalyst inhibitors include those containing unsaturated organic compounds; such as ethylenically or aromatically unsaturated amides, U.S. Pat. Nos. 4,337,332; acetylenic compounds, 3 445,420; ethylenically unsaturated isocyanates, 3,882,083; olefinic siloxanes, 3,989,667; and conjugated ene-ynes, 4.465.818 and 4,472,563; other organic compounds such as hydroperoxides, sulfoxides, amines, phosphines, phosphites and nitriles; and various metal salts.

More relevantly, the unsaturated hydrocarbon diester inhibitors of U.S. Pat. No. 4,56,870, such as diallyl or diethyl maleate, and the bis-hydrocarbonoxyalkyl maleate inhibitors of U.S. Pat. No. 4,562,096, such as bis-(2-methoxyisopropyl) maleate, have been found to be effective for delaying or preventing the room temperature cure of organosilicon compositions which cure by way of a platinum group metal catalyzed reaction. However, the cure time and/or the cure temperature of these maleate-inhibited compositions are/is undesirably increased by the use of these inhibitors.

This problem of increased cure time and/or cure temperature in an inhibited platinum-catalyzed system is of particular significance for applications where the organosilicon composition is used to rapidly coat a substrate, such as is practiced in the adhesive release coating art.

In the coating arts, such as the paper coating art, the coating composition that is used to coat a substrate should not cure to the extent that its viscosity has increased substantially before it has been applied to the substrate; however, it should rapidly cure thereafter, preferably with only a moderate amount of added energy. This means that the coating compositions preferably should not experience a doubling of its viscosity at ambient temperature for as long as eight hours, but should cure rapidly, at moderately increased temperature, to such an extent that the coated substrate can be further processed.

Furthermore, when the cured coating composition is to be immediately coated with a reactive adhesive, such as an acrylic-based pressure-sensitive adhesive composition, the release coating must be fully cured before the adhesive composition is applied in order to minimize the bonding of the adhesive to the partially cured silicone coating, a phenomenon known as "acrylic weld".

Compositions having improved curing characteristics, and little or no acrylic weld, have been disclosed in U.S. Pat. No. 4,609,574. The improvements of these compositions have been realized by the use of higher alkenyl radicals, such as hexenyl, instead of the usual vinyl radical, as the reactive olefinic hydrocarbon radical. However, even in these improved compositions, the cure rate of the higher alkenyl reaction site has not been fully utilized because the catalyst inhibitor is excessively active at elevated temperatures.

The quest for the ideal platinum catalyst inhibitor in silicon-containing compositions, particularly coating compositions, continues.

BRIEF SUMMARY OF THE INVENTION

It is an object of this invention to provide improved curable organosilicon compositions. It is also an object of this invention to provide organopolysiloxane compositions which do not cure at room temperature for long periods of time but which cure rapidly when heated to moderately elevated temperatures. It is a particular object of the present invention to provide liquid organopolysiloxane coating compositions which remain liquid for hours at temperatures up to 104° F. (40° C.) but which cure within 90 seconds when coated onto a substrate and heated to a temperature of as low as 180° F. (82° C.). It is an additional object of this invention to provide curable compositions for adhesive release which do not experience acrylic weld.

These objects, and others which will occur to one of ordinary skill in the curable organosilicon composition art upon considering the following disclosure and appended claims, are obtained by the present invention which, briefly stated, comprises a curable organosilicon composition comprising a component having silicon-bonded hydrogen atoms, a component having silicon-bonded olefinic hydrocarbon radicals reactive therewith, a platinum-containing catalyst and an effective amount of a diorgano fumarate cure control, i.e. catalyst inhibitor, component.

Surprisingly, the room temperature cure times of the organo-polysiloxane coating compositions of this invention are adequately long, and their cure times at elevated temperature are advantageously brief, that they are useful in fast-paced coating operations, such as adhesive release coating operations wherein the cured coating is further coated in-line, i.e., immediately after being cured, with an acrylic-based adhesive.

DETAILED DESCRIPTION OF THE INVENTION

The present invention relates to a curable composition comprising (A) an organosilicon compound having an average of from one to three silicon-bonded monovalent radicals per silicon atom selected from the group consisting of hydrocarbon and halohydrocarbon radicals, there being an average of at least two of said monovalent radicals, per molecule of Component (A), selected from the group consisting of olefinic hydrocarbon radicals, the remaining silicon valences thereof being satisfied by divalent radicals free of aliphatic unsaturation selected from the group consisting of oxygen atoms, hydrocarbon radicals, hydrocarbon ether radicals, halohydrocarbon ether radicals and halohydrocarbon radicals, said divalent radicals linking silicon atoms, (B) an organohydrogensilicon compound containing at least two silicon-bonded hydrogen atoms per molecule thereof and an average of from one to two silicon-bonded monovalent radicals free of aliphatic unsaturation, per silicon atom, selected from the group consisting of hydrocarbon and halohydrocarbon radicals, the remaining silicon valences thereof being satisfied by divalent radicals free of aliphatic unsaturation selected from the group consisting of oxygen atoms, hydrocarbon radicals, hydrocarbon ether radicals, halohydrocarbon ether radicals and halohydrocarbon radicals, said divalent radicals linking silicon atoms, (C) an amount of a platinum-containing catalyst sufficient to accelerate a reaction of said silicon-bonded olefinic hydrocarbon radicals with said silicon-bonded hydrogen atoms at room temperature, and (D) an amount of an inhibitor compound for the platinum-containing catalyst sufficient to retard said reaction at room temperature but insufficient to prevent said reaction at elevated temperature, said inhibitor compound having the formula

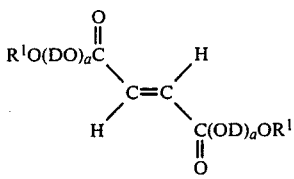

wherein each $R^1$ denotes, independently, a monovalent hydrocarbon radical having from 1 to 6 carbon atoms, each D denotes, independently, an alkylene radical having from 2 to 4 carbon atoms and each a has an average value of 0 or 1, the amounts of Components (A) and (B) being sufficient to provide a ratio of the number of silicon-bonded hydrogen atoms to the number of silicon-bonded olefinic hydrocarbon radicals of from 1/100 to 100/1.

Herein the term "curable", as applied to compositions of this invention, generally denotes a chemical change which leads to an increase in the molecular weight of one or more of the components in the composition. Said increase in molecular weight, typically, is accompanied by an increase in the viscosity of the curable composition. For the coating compositions of this invention the term curable denotes a change in the state of the composition from a liquid to a solid. For coating compositions of this invention which are to be used as adhesive-release coatings the term "curable" has a more detailed meaning which encompasses the properties of smear, migration and rub-off of the coating, as delineated below.

The curing of the compositions of this invention is accomplished by hydrosilylation, i.e., a platinum-catalyzed addition reaction between silicon-bonded olefinic hydrocarbon radicals of Component (A) and silicon-bonded hydrogen atoms of Component (B).

Broadly stated, Component (A) of the compositions of this invention can be any organosilicon compound containing two or more silicon atoms linked by divalent radicals and containing an average of from 1 to 3 silicon-bonded monovalent radicals per silicon, with the proviso that the organosilicon compound contains at least two silicon-bonded olefinic hydrocarbon radicals. This component can be a solid or a liquid, freely flowing or gum-like.

Examples of said divalent radicals linking silicon atoms in Component (A) include oxygen atoms, which provide siloxane bonds, and aliphatically saturated hydrocarbon, hydrocarbon ether, halohydrocarbon ether and halohydrocarbon radicals which provide silcarbane bonds. The divalent radicals can be the same or different, as desired.

Examples of suitable divalent hydrocarbon radicals include any alkylene radical, such as $-CH_2-$, $-CH_2CH_2-$, $-CH_2(CH_3)CH-$, $-(CH_2)_4-$, $-CH_2CH(CH_3)CH_2-$, $-(CH_2)_6-$ and $-(CH_2)_{18}-$; cycloalkylene radical, such as cyclohexylene; arylene radical, such as phenylene and combinations of hydrocarbon radicals, such as benzylene, i.e. $-C_6H_4CH_2-$.

Examples of suitable divalent halohydrocarbon radicals include any divalent hydrocarbon radical wherein one or more hydrogen atoms have been replaced by halogen, such as fluorine, chlorine or bromine. Preferable divalent halohydrocarbon radicals have the formula $-CH_2CH_2C_nF_{2n}CH_2CH_2-$ wherein n has a value of from 1 to 10 such as, for example, $-CH_2CH_2CF_2CF_2CH_2CH_2-$.

Examples of suitable divalent hydrocarbon ether radicals and halohydrocarbon ether radicals include $-CH_2CH_2OCH_2CH_2-$, $-CH_2CH_2CF_2OCF_2CH_2CH_2-$, $-CH_2CH_2OCH_2CH_2CH_2-$ and $-C_6H_4-O-C_6H_4-$.

Examples of said monovalent radicals in Component (A) include halohydrocarbon radicals free of aliphatic unsaturation and hydrocarbon radicals.

Examples of suitable monovalent hydrocarbon radicals include alkyl radicals, such as $CH_3-$, $CH_3CH_2-$, $(CH_3)_2CH-$, $C_8H_{17}-$, $C_{10}H_{21}-$ and $C_{20}H_{41}-$; cycloaliphatic radicals, such as cyclohexyl; aryl radicals such as phenyl, tolyl, xylyl, anthracyl and xenyl; aralkyl radicals, such as benzyl and 2-phenylethyl; and olefinic hydrocarbon radicals, such as vinyl, allyl, methallyl, 3-butenyl,5-hexenyl, 7-octenyl, cyclohexenyl and styryl. Alkenyl radicals are preferably terminally unsaturated. Of the higher alkenyl radicals those selected from the group consisting of 5-hexenyl, 7 octenyl, and 9-decenyl are preferred because of the more ready availability of the alpha,omega-dienes used to prepare the alkenylsiloxanes. Highly preferred monovalent hydrocarbon radical for the silicon-containing components of the compositions of this invention are methyl, phenyl, vinyl and 5-hexenyl. Examples of suitable aliphatically saturated monovalent halohydrocarbon radicals include any monovalent hydrocarbon radical which is free of aliphatic unsaturation and has at least one of its hydrogen atoms replaced with halogen, such as fluorine, chlorine or bromine. Preferable monovalent halohydrocarbon radicals have the formula $C_nF_{2n+1}CH_2CH_2-$ wherein n has a value of from 1 to 10, such as, for example, $CF_3CH_2CH_2-$ and $C_4F_9CH_2CH_2-$.

Component (A) of the compositions of this invention is typically an organopolysiloxane having the average unit formula $R_c^2SiO_{(4-c)/2}$ wherein $R_2$ denotes said monovalent radicals, delineated and limited above, and c has a value of from 1 to 3, such as 1.2, 1.9, 2.0, 2.1, 2.4 and 3.0. Suitable siloxane units in the organopolysiloxanes having the above average unit formula have the formulae $R_3^2SiO_{1/2}$, $R_2^2SiO_{2/2}$, $R^2SiO_{3/2}$ and $SiO_{4/2}$. Said siloxane units can be combined in any molecular arrangement such as linear, branched, cyclic and combinations thereof, to provide organopolysiloxanes that are useful as Component (A).

A preferred organopolysiloxane Component (A) for the composition of this invention is a substantially linear organopolysiloxane having the formula $XR_2SiO(XRSiO)_xSiR_2X$. By substantially linear it is meant that the component contains no more than trace amounts of silicon atoms bearing 3 or 4 siloxane linkages. It is to be understood that the term substantially linear encompasses organopolysiloxanes which can contain up to about 15 percent by weight cyclopolysiloxanes which are frequently co-produced with the linear organopolysiloxanes.

In the formula shown immediately above each R denotes a monovalent hydrocarbon or halohydrocarbon radical free of aliphatic unsaturation and having from 1 to 20 carbon atoms, as exemplified above. The several R radicals can be identical or different, as desired. Additionally, each X denotes an R radical or an olefinic hydrocarbon radical having from 2 to 12 carbon atoms, as exemplified above. Of course, at least two X radicals are olefinic hydrocarbon radicals.

The value of the subscript x in the above formula is such that the linear organopolysiloxane (A) has a viscosity at 25° C. of at least 25 millipascal-seconds (25 centipoise). The exact value of x that is needed to provide a viscosity value falling within said limit depends upon the identity of the X and R radicals; however, for hydrocarbyl-terminated polydimethylsiloxane x will have a value of at least about 25.

In terms of preferred monovalent hydrocarbon radicals, noted above, examples of preferred linear organopolysiloxanes of the above formula which are suitable as Component (A) for the composition of this invention include $PhMeViSiO(Me_2SiO)_{100}SiPhMeVi$,
$HexMe_2SiO(Me_2SiO)_{150}SiMe_2Hex$,
$ViMe_2SiO(Me_2SiO)_{100}(HexMeSiO)_2SiMe_2Vi$,
$ViMe_2SiO(Me_2SiO)_{0.95x}(MeViSiO)_{0.05x}SiMe_2Vi$,
$HexMe_2SiO(Me_2SiO)_{150}(HexMeSiO)_4SiMe_2Hex$,
$Me_3SiO(Me_2SiO)_{0.9x}(MeViSiO)_{0.1x}SiMe_3$,
$Me_3SiO(Me_2SiO)_{100}(MeHexSiO)_8SiMe_3$,
$PhMeViSiO(Me_2SiO)_{0.93x}(MePhSiO)_{0.07x}SiPhMeVi$ and
$ViMe_2SiO(Me_2SiO)_xSiMe_2Vi$ wherein Me, Vi, Hex and Ph denote methyl, vinyl, 5-hexenyl and phenyl, respectively.

For coating composition of this invention it is highly preferred that the linear organopolysiloxanes (A) have the formula $XMe_2SiO(Me_2SiO)_b(MeXSiO)_dSiMe_2X$ wherein X is as noted above and the sum of b plus d is equal to x, also noted above. The values of the subscripts b and d can each be zero or greater; however, the value of d is typically less than 0.1b such as zero, 0.02b or 0.08b. Examples of highly preferred linear organopolysiloxanes (A) for adhesive-release coating compositions of this invention include $Me_3SiO(Me_2SiO)_b(MeHexSiO)_dSiMe_3$,
$Me_3SiO(Me_2SiO)_b(MeViSiO)_dSiMe_3$,
$HexMe_2SiO(Me_2SiO)_b(MeHexSiO)_dSiMe_2Hex$ and
$ViMe_2SiO(Me_2SiO)_b(MeViSiO)_dSiMe_2Vi$.

In a preferred embodiment of the present invention, wherein the curable composition, preferably solventless, is used to coat a solid substrate, such as paper, with an adhesive-releasing coating, the value of b plus d in the highly preferred organopolysiloxane (A) is sufficient to provide a viscosity at 25° C. for the Component (A) of at least 100 mPa.s, such as from about 100 mPa.s to about 100 Pa.s, preferably from about 100 mPa.s to 10 Pa.s and, most preferably, from 100 mPa.s to 5 Pa.s; said viscosities corresponding approximately to values of b+d of at least 60, such as from 60 to 1000, preferably to 520 and, most preferably, to 420.

Broadly stated, Component (B) of the compositions of this invention can be any organohydrogensilicon compound which is free of aliphatic unsaturation and contains two or more silicon atoms linked by divalent radicals, an average of from one to two silicon-bonded monovalent radicals per silicon atom and an average of at least two, and preferably three or more, silicon-bonded hydrogen atoms per molecule thereof.

Examples of said divalent radicals linking silicon atoms in Component (B) are as delineated above for Component (A), including preferred examples. As with Component (A), the divalent radicals within Component (B) can be identical or different, as desired. Furthermore, the divalent radicals that are present in Component (B) can, but need not, be the same as the divalent radicals that are present in Component (A).

Examples of said monovalent radicals in Component (B) include hydrocarbon and halohydrocarbon radicals, as delineated above for Component (A), including preferred examples, which are free of aliphatic unsaturation. The monovalent radicals that are present in Component (B) can, but need not, be the same as the monovalent radicals that are present in Component (A).

Component (B) must contain an average of at least two silicon-bonded hydrogen atoms per molecule thereof. Preferably Component (B) contains an average of three or more silicon-bonded hydrogen atoms such as, for example, 5, 10, 20, 40 and more.

Component (B) typically has a 100 percent siloxane structure, i.e., an organohydrogenpolysiloxane structure having the average unit formula $R_e^3H_fSiO_{(4-e-f)/2}$ wherein $R^3$ denotes said monovalent radical free of aliphatic unsaturation, f has a value of from greater than 0 to 1, such as 0.001, 0.01, 0.1 and 1.0, and the sum of e plus f has a value of from 1 to 2, such as 1.2 1.9 and 2.0.

Suitable siloxane units in the organohydrogenpolysiloxanes having the average unit formula immediately above have the formulae $R_3^3SiO_{1/2}$, $R_2^3HSiO_{1/2}$, $R_2^3SiO_{2/2}$, $R^3HSiO_{2/2}$, $R^3SiO_{3/2}$, $HSiO_{3/2}$ and $SiO_{4/2}$. Said siloxane units can be combined in any molecular arrangement such as linear, branched, cyclic and combinations thereof, to provide organohydrogenpolysiloxanes that are useful as Component (B).

A preferred organohydrogenpolysiloxane Component (B) for the compositions of this invention is a substantially linear organohydrogenpolysiloxane having the formula $YR_2SiO(YRSiO)_ySiR_2Y$ wherein each R denotes a monovalent hydrocarbon or halohydrocarbon radical free of aliphatic unsaturation and having from 1 to 20 carbon atoms, as exemplified above. The several R radicals can be identical or different, as desired. Additionally, each Y denotes a hydrogen atom or an R radical. Of course, at least two Y radicals must be hydrogen atoms.

The value of the subscript y is not critical; however it is preferably such that the organohydrogenpolysiloxane Component (B) has a viscosity at 25° C. up to 100 millipascal-seconds. The exact value of y needed to provide a viscosity value falling within said limits depends upon the number and identity of the R radicals; however, for organohydrogenpolysiloxanes containing only methyl radicals as R radicals y will have a value of from about 0 to about 100.

In terms of preferred monovalent hydrocarbon radicals, noted above, examples of linear organohydrogenpolysiloxanes of the above formula which are suitable as Component (B) for the compositions of this invention include $HMe_2SiO(Me_2SiO)_ySiMe_2H$,
$Me_3SiO(MeHSiO)_ySiMe_3$, $HMe_2SiO(Me_2SiO)_{0.5y}(MeHSiO)_{0.5y}SiMe_2H$, HMe$_2$SiO(Me$_2$SiO)$_{0.5y}$(MePhSiO)$_{0.1y}$(MeHSiO)$_{0.4y}$SiMe$_2$H, Me$_3$SiO(Me$_2$SiO)$_{0.4y}$(MeHSiO)$_{0.6y}$SiMe$_3$, (MeHSiO)$_y$, (HMe$_2$SiO)$_4$Si and MeSi(OSiMe$_2$H)$_3$.

Highly preferred linear organohydrogenpolysiloxane (B) for the coating compositions of this invention have the formula YMe$_2$SiO(Me$_2$SiO)$_p$(MeYSiO)$_q$SiMe$_2$Y wherein Y denotes a hydrogen atom or an R radical, free of aliphatic unsaturation. Again, an average of at least two Y radicals per molecule of Component (B) must be hydrogen atoms. The subscripts p and q can have average values of zero or more and the sum of p plus q has a value equal to y, noted above.

For the adhesive-releasing coating compositions of this invention Y should be H or methyl. A particularly effective organohydrogenpolysiloxane component (B) for the compositions of this invention comprises a mixture of two compounds having the formulae Me$_3$SiO(MeHSiO)$_{35}$SiMe$_3$ and Me$_3$SiO(Me$_2$SiO)$_3$(MeHSiO)$_5$SiMe$_3$.

The amounts of Components (A) and (B) that are used in the compositions of this invention are not narrowly limited. Said amounts, expressed in terms of the ratio of the number of silicon-bonded hydrogen atoms of Component (B) to the number of silicon-bonded olefinic hydrocarbon radicals of Component (A), as is typically done, are sufficient to provide a value for said ratio of from 1/100 to 100/1, usually from 1/20 to 20/1, and preferably from 1/2 to 20/1.

For the liquid coating compositions of this invention which are to be used in the coating method of this invention, hereinbelow delineated, the value of said ratio should have a value of from 1/2 to 1.5/1, and preferably about 1/1.

Organosilicon polymers are, of course, well known in the organosilicon art. Organopolysiloxanes are clearly the most significant and most widely used form of organosilicon polymers in the art, and in this invention; many are commercially prepared. The preparation of the organosilicon components that are used in the compositions of this invention is well documented and needs no intensive delineation herein.

Briefly, organopolysiloxanes are typically prepared by way of hydrolysis and condensation of hydrolyzable silanes such as Me$_2$SiCl$_2$, Me$_3$SiCl, MeSiCl$_3$, SiCl$_4$, Me$_2$Si(OMe)$_2$, MeSi(OMe)$_3$ and Si(OCH$_2$CH$_3$)$_4$ or by way of acid- or alkali-catalyzed siloxane equilibration of suitable siloxane precursors such as (Me$_2$SiO)$_4$ and Me$_3$SiOSiMe$_3$, which themselves are prepared by way of said hydrolysis and condensation reactions.

Organopolysiloxane Component (A) can be prepared as noted above with the proviso that a silane or siloxane containing at least one silicon-bonded olefinic hydrocarbon radical is used, alone or in conjunction with other silanes or siloxanes, in sufficient amount to provide the necessary number of olefinic hydrocarbon radicals in the organopolysiloxane. Examples of olefinic hydrocarbon radical-containing silanes or siloxanes include, but are not limited to, ViMe$_2$SiCl, HexMe$_2$SiCl, MeViSiCl$_2$, MeHexSiCl$_2$, ViSiCl$_3$, HexSiCl$_3$, (MeViSiO)$_4$, HexMe$_2$SiOSiMe$_2$Hex and ViMe$_2$SiOSiMe$_2$Vi.

It is usually preferred to prepare olefinic siloxanes by hydrolyzing a readily hydrolyzable silane, such as 5-hexenyl- or vinyl-methyldichlorosilane, in excess water and then equilibrating the resulting hydrolyzate with cyclopolydimethylsiloxanes and a siloxane oligomer containing triorganosiloxane end groups, using a base catalyst such as KOH. However, it is believed that olefinic polydiorganosiloxanes may also be advantageously prepared in a one-step acid-catalyzed process wherein the hydrolyzable silane is hydrolyzed and simultaneously equilibrated with cyclopolydimethylsiloxanes and siloxane oligomer containing end groups.

Alternatively, known polyorganohydrogensiloxanes bearing reactive SiH groups can be reacted with an alpha,omega-diene, such as 1,5-hexadiene, to prepare higher alkenyl-substituted organopolysiloxanes. It should be noted that linear siloxanes produced by equilibration procedures may contain small amounts such as 0 to 15 weight percent of cyclopolydiorganosiloxanes which may be volatile at temperatures up to 150° C. For the purposes of this invention either siloxanes that still contain the small amounts of cyclics, or siloxanes from which the co-produced cyclics have been removed by volatilization may be used.

Organohydrogenpolysiloxane Component (B) can be prepared as noted above with the proviso that a silane or siloxane containing at least one silicon-bonded hydrogen atom, instead of olefinic hydrocarbon radical, is used, alone or in combination with other silanes or siloxanes, in sufficient amount to provide the necessary number of silicon-bonded hydrogen atoms in the organohydrogenpolysiloxane. Examples of hydrogen atom-containing silanes or siloxanes include, but are not limited to, HMe$_2$SiCl, HMeSiCl$_2$, HSiCl$_3$, HMe$_2$SiOSiMe$_2$H and (MeHSiO)$_4$. Component (B) is preferably prepared under nonalkaline conditions to minimize hydrolysis of the SiH linkage.

Organosilicon polymers having a mix of silcarbane and siloxane structure can be prepared, for example, from monomeric species that have nonoxygen divalent radicals, such as O$_{1/2}$Me$_2$SiCH$_2$CH$_2$Me$_2$SiO$_{1/2}$ or ClMe$_2$SiC$_6$H$_4$SiMe$_2$Cl, using standard hydrolysis and condensation reactions, noted above, and incorporating one or more of the olefinic hydrocarbon radicals or hydrogen atom-containing silanes or siloxanes noted above, and other silanes or siloxanes, as desired.

Organosilicon polymers which contain no siloxane bonds can be prepared, for example, by a hydrosilylation reaction between silanes or silcarbanes bearing silicon-bonded olefinically unsaturated hydrocarbon radicals, such as Vi$_2$SiMe$_2$ or ViMe$_2$SiC$_6$H$_4$SiMe$_{22}$Vi and silanes or silcarbanes bearing silicon-bonded hydrogen atoms, such as H$_2$SiMe$_2$ or HMe$_2$SiC$_6$H$_4$SiMe$_2$H.

Other suitable methods for preparing the organosilicon components that are used in the compositions of this invention also occur in the organosilicon art.

Broadly stated, Component (C) of the composition of this invention is a catalyst component which facilitates the reaction of the silicon-bonded hydrogen atoms of Component (B) with the silicon-bonded olefinic hydrocarbon radicals of Component (A) and can be any platinum-containing catalyst component. For example, Component (C) can be platinum metal; a carrier such as silica gel or powdered charcoal, bearing platinum metal; or a compound or complex of a platinum metal.

A typical platinum-containing catalyst component in the organopolysiloxane compositions of this invention is any form of chloroplatinic acid, such as, for example, the readily available hexahydrate form or the anhydrous form, because of its easy dispersibility in organosiloxane systems. A particularly useful form of chloroplatinic acid is that composition obtained when it is reacted with an aliphatically unsaturated organosilicon compound such as divinyltetramethyldisiloxane, as disclosed by U.S. Pat. No. 3,419,593 incorporated herein by reference.

The amount of platinum-containing catalyst component that is used in the compositions of this invention is not narrowly limited as long as there is a sufficient amount to accelerate a room temperature reaction between the silicon-bonded hydrogen atoms of Component (B) with the silicon-bonded olefinic hydrocarbon radicals of Component (A). The exact necessary amount of said catalyst component will depend upon the particular catalyst and is not easily predictable. However, for chloroplatinic acid said amount can be as low as one part by weight of platinum for every one million parts by weight of organosilicon Components (A) plus (B). Preferably said amount is at least 10 parts by weight, on the same basis.

For compositions of this invention which are to be used in the coating method of this invention the amount of platinum-containing catalyst component to be used is preferably sufficient to provide from 10 to 500 parts by weight platinum per one million parts by weight of organopolysiloxane Components (A) plus (B).

Broadly stated, Component (D) of the compositions of this invention is any diorgano fumarate having the formula trans-$R_1O(DO)_a(O)CCH=CHC(O)(OD)_aOR^1$. The diorgano fumarate can be a dihydrocarbon fumarate or a dihydrocarbonoxyalkyl fumarate. That is to say, the value of subscript a in the formula immediately above can have a value equal to zero or 1. The individual values of a can be identical or different, as desired.

The hydrocarbon radical, i.e., the $R^1$ radical, in the above formula has from 1 to 6 carbon atoms and can be, for example, an alkyl radical such as methyl, ethyl, propyl, isopropyl, butyl, pentyl or hexyl; an aryl radical such as phenyl; an alkenyl radical such as vinyl or allyl; or a cyclohydrocarbon radical such as cyclohexyl.

In the above formula for the diorgano fumarate each D denotes, independently, an alkylene raddical having from 2 to 4 carbon atoms such as $—CH_2(CH_2—$, $—CH_2(CH_3)CH—$, $—CH_2CH_2CH_2—$, $—CH_2CH_2CH_2CH_2—$, $—CH_2(CH_3CH_2)CH—$ and $—CH_2CH_2(CH_3)CH—$. The individual D radicals can be identical or different, as desired.

In terms of ease of preparation and inhibiting effect in the compositions of this invention a preferred group of diorgano fumarates is the dihydrocarbon fumarates of the above formula wherein the value of a is zero. It has been found that for compositions of this invention wherein the organosilicon component (A) is a linear methylsiloxane the dihydrocarbon fumarates provide a superior inhibiting action than the dihydrocarbonoxyalkyl fumarates of the above formula where a has a value of 1.

Unexpectedly, I have found that diallyl fumarate provides faster initial cure, and less drift in cure rate as the composition ages at room temperature, than diallyl maleate and other maleates and fumarates, when the organopolysiloxane polymer, Component (A), bears 5-hexenyl radicals as the olefinic hydrocarbon radicals. It is these compositions which have cure rates which approach closely the maximum cure rates that are available in uninhibited higher alkenyl-substituted coating compositions.

Also unexpected was the discovery that diethyl fumarate provides faster cure than diethyl maleate, and other maleates and fumarates, when the organopolysiloxane polymer, Component (A), bears vinyl radicals as the olefinic hydrocarbon radicals.

Diorgano fumarates can be prepared by any known method. For example, symmetrical diorgano fumarates can be prepared by the full esterification of fumaric acid or fumaryl chloride with a suitable alcohol, such as methanol, ethanol, isopropanol, allyl alcohol, methoxyethanol allyloxyethanol or methoxyisopropanol. Asymmetrical diorgano fumarates can be prepared, for example, by the half esterification of fumaric acid, using a first alcohol, such as methanol, followed by full esterification of the resulting half acid ester with a second alcohol, such as ethanol.

The amount of diorgano fumarate to be used in the compositions of this invention is not critical and can be any amount that will retard the above-described platinum-catalyzed hydrosilylation reaction at room temperature while not preventing said reaction at moderately elevated temperature. While not wishing to be limited by any theory I believe that there should be at least three molecules of fumarate inhibitor for each platinum atom in the composition, to form a room temperature stable complex therebetween. Preferably a large excess of fumarate molecules, compared to platinum atoms, is used.

In the liquid organopolysiloxane compositions that are used in the coating method of this invention the amount of diorgano fumarate is typically sufficient to provide from 25 to 50 molecules thereof for every platinum atom in the composition.

The addition of the Component (D) to a composition comprising (A), (B) and (C) delays cure of the composition at room temperature over long periods of time, but at temperatures in excess of 70° C. the inhibiting effect of the diorgano fumarate observed at room temperature disappears and a faster curing rate is realized. The cure of the curable composition can be retarded at room temperature for short periods of time or for very long periods of time by the use of a proper amount of diorgano fumarate. No exact amount of diorgano fumarate can be suggested to give a specified storage life at room temperature. The rate of cure will depend upon the ratio of diorgano fumarate molecules to platinum atoms in the catalyst, the form of the platinum catalyst, the structure of the diorgano fumarate, the structures and amounts of Components (A) and (B) and the presence or absence of other nonessential ingredients. Diorgano fumarates added in small amounts such as 0.1 weight percent based on the weight of the curable composition provide increased pot life in all systems, but, in most cases, do not fully retard the reaction at room temperature. In larger amounts such as 3 weight percent diorgano fumarate, they provide completely inhibited cures at room temperature. The amount of diorgano fumarate is therefore dependent upon the desired use, and the nature of the system.

Thus, while I have generally taught the broad and narrow limits for the inhibitor component concentration in my compositions the skilled worker can readily determine the optimum level thereof for each system, if desired.

The composition of this invention can contain any of the optional components commonly used in platinum-catalyzed organosilicon compositions, such as fillers, solvents, surfactants. colorants, stabilizers and physical property modifiers.

Examples of fillers useful in the compositions of this invention include reinforcing fillers and extending fillers. Examples of reinforcing fillers include: silica, such as fume silica and precipitated silica; and treated silica, such as fume or precipitated silica that has been reacted with e.g., an organohalosilane, a disiloxane, or a disilazane.

Examples of extending fillers include crushed quartz. aluminum oxide, aluminum silicate, zirconium silicate, magnesium oxide, zinc oxide, talc, diatomaceous earth, iron oxide, calcium carbonate, clay, titania, zirconia, mica, glass, such as ground glass or glass fiber, sand,, carbon black, graphite, barium sulfate, zinc sulfate, wood flour, cork, fluorocarbon polymer powder, rice hulls, ground peanut shells, and the like.

Examples of said solvents include aliphatic hydrocarbons, such as pentane, hexane, heptane, octane, nonane and the like; aromatic hydrocarbons such as benzene, toluene and xylene; alcohols such as methanol, ethanol, and butanol; ketones such as acetone, methylethyl ketone and methylisobutyl ketone; and halogenated solvents such as fluorine-, chlorine-, and bromine- substituted aliphatic or aromatic hydrocarbons, such as trichloroethane, perchloroethylene, bromobenzene and the like. Two or more solvents may be used together.

Examples of stabilizers include antimicrobial preparations, mildewcides, antioxidants, flame retardants and ultra-violet radiation stabilizers.

Examples of physical property modifiers include adhesion promoters, crosslinking agents and controlled release additives, such as the siloxane resins disclosed in U.S. Pat. No. 3,527,659.

The compositions of this invention can be made by homogeneously mixing Components (A), (B), (C) and (D), and any optional components, using suitable mixing means, such as a spatula, a drum roller, a mechanical stirrer, a three-roll mill. a sigma blade mixer, a bread dough mixer, and a two- roll mill.

The order of mixing Components (A) through (D) is not critical; however, it is preferred that Components (B) and (C) be brought together in the presence of Component (D), most preferably in a final mixing step. Thus, it is possible to mix all components in one mixing step immediately prior to the intended use of the curable composition. Alternatively, certain components can be premixed to form two or more packages which can be stored, if desired, and then mixed in a final step immediately prior to the intended use thereof.

It is preferred to mix Components (C), (D) and a portion of Component (A), along with certain optional components such as fillers and solvents, to provide a first package and Component (B), along with the remaining portion of Component (A), if any, to provide a second package. These two packages can then be stored until the composition of this invention is desired and then homogeneously mixed.

It is also possible to place Components (B), (C) and (D) in three separate packages and to place Component (A) in one or more of said separate packages and the three packages stored until needed.

The compositions of this invention have utility as formable compositions to provide organosilicon articles such as O-rings, tubing, wire-coating and gaskets; as encapsulant and sealant compositions; and as coating compositions, among others.

In another aspect the present invention relates to a process for rendering a solid surface of a substrate less adherent to materials that normally adhere thereto, said process comprising (I) applying to said solid surface a coating of a liquid curable composition comprising an organopolysiloxane component (A) having the formula $XMe_2SiO(Me_2SiO)_b(MeXSiO)_dSiMe_2X$, wherein Me denotes methyl, X denotes a monovalent radical selected from the group consisting of olefinic hydrocarbon radicals having from 2 to 12 carbon atoms and R radicals, an average of at least two X radicals per molecule of Component (A) being olefinic hydrocarbon radicals, R denotes a monovalent hydrocarbon or halohydrocarbon radical free of aliphatic unsaturation having from 1 to 20 carbon atoms, b and d have average values of zero or more, and the sum of b plus d has a value sufficient to provide a viscosity at 25° C. of at least 25 millipascal-seconds for the Component (A): an organohydrogenpolysiloxane component (B) bearing at least two silicon-bonded hydrogen atoms per molecule thereof and having the average unit formula $R_e^3H_fSiO_{(4-e-f)/2}$ wherein $R^3$ denotes a monovalent hydrocarbon or halohydrocarbon radical free of aliphatic unsaturation, f has a value of from greater than 0 to 1 and the sum of e plus f has a value of from 1 to 2; an amount of a platinum-containing catalyst component (C) sufficient to accelerate a reaction of said silicon-bonded olefinic hydrocarbon radicals with said silicon-bonded hydrogen atoms at room temperature; and an amount of an inhibitor component (D) having the formula

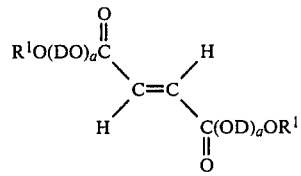

wherein $R^1$ denotes a monovalent hydrocarbon radical having from 1 to 6 carbon atoms, each D denotes, independently, an alkylene radical having from 2 to 4 carbon atoms and each a has an average value of 0 or 1; the amounts of Components (A) and (B) being sufficient to provide a ratio of the number of silicon-bonded hydrogen atoms to the number of silicon-bonded olefinic hydrocarbon radicals of from ½ to 1.5/1. and (II) heating the applied coating for a period of time sufficient to cure the applied coating.

The several components, necessary and optional, of the compositions that are used in the method of this invention are the same as the components detailed above for the compositions of this invention.

In the process of this invention the liquid curable organopolysiloxane composition is coated onto a solid surface of a substrate, preferably at room temperature, and thereafter heated to effect a cure of the coating. The coating process can be accomplished by any suitable manner known in the art, such as by spreading, brushing, extruding, spraying and rolling.

A significant characteristic of the liquid curable compositions of this invention is the long pot life that they have, wherein the viscosity thereof does not double in value over a period of several hours, thereby allowing an extended application period.

As to composition the solid surfaces that can be coated by the process of this invention include cellulosic surfaces such as wood, cardboard and cotton; metallic surfaces such as aluminum, copper, steel and silver; siliceous surfaces such as glass and stone; synthetic polymer surfaces such as polyolefins, polyamides, polyesters and polyacrylates; and others.

As to form the substrate can be sheetlike, such as an adhesive release liner, a textiles or a foil; or substantially three-dimensional in form. The surface of the substrate can be substantially smooth or rough in a regular or irregular manner.

After the liquid curable composition has been coated onto a substrate it is preferably heated moderately to convert the liquid coating to the nonliquid state. By moderately it is meant to a temperature of from about 70° to 100° C.

A significant characteristic of the process of this invention is the rapid curing that occurs when the coated composition is heated to, for example. 70° C. Typically the coated composition will cure fully when heated, for example, at 82° C. for 90 seconds or less. Higher temperatures. such as up to 160° C., will provide correspondingly shorter curing times.

In a preferred embodiment of the process of this invention a flexible sheet material, such as paper, metal foil or tapestock, is coated with a thin coating of the liquid curable composition, preferably in a continuous manner, and the thus-coated material is then heated to rapidly cure the coating, to provide a sheetlike material bearing on at least one surface thereof an adhesive-releasing coating.

The adhesive-releasing coating can be subsequently brought into contact with a pressure sensitive adhesive composition, either immediately or at a later time, to form an article having a peelable adhesive/coating interface.

Examples of such an article include, adhesive labels having a peelable backing, adhesive tape in roll form and sticky materials packaged in a peelable container, such as foods, asphalt and gum.

The following examples are disclosed to further teach, but not limit, the invention which is properly delineated by the appended claims. All amounts (parts and percentages) are by weight unless otherwise indicated. Viscosities were measured with a rotating spindle viscometer.

Bath life of a composition means the time interval required for the viscosity of the composition to reach a value of twice the room temperature viscosity of the freshly prepared composition.

Cure time for a composition means the time interval required for the composition, when coated onto S2S kraft paper, at a thickness of 1 pound per ream, to attain the no smear, no migration, no rub-off condition.

The no smear condition was determined by lightly streaking the coating with a finger and observing for the absence of haze in the streaked area.

The no migration condition was determined by firmly adhering a common, pressure sensitive adhesive tape to the coating, removing the tape and folding the removed tape together, adhesive surfaces to each other. Absence of migration of the coating to the tape was indicated by noting that the doubled tape was as difficult to separate as unused tape so doubled.

The no rub-off condition was determined by vigorously rubbing the coating with the index finger and noting that the coating could not be removed from the paper.

The maleates and fumarates disclosed herein were prepared by the reaction of maleic and fumaric acid, respectively, with the appropriate alcohol. A water-azeotroping solvent and concentrated $H_2SO_4$ were also used to conduct the esterification reaction. Following removal of water of esterification by azeotropic distillation the reaction mixtures were washed with 10% aqueous NaHCO3 and then with water. dried and the reaction products were isolated by vacuum fractional distillation.

A 5-hexenyldimethylsiloxane-endblocked copolymer of dimethylsiloxane units and 5-hexenylmethylsiloxane units having the average formula $HexMe_2SiO(Me_2SiO)_{151}(MeHexSiO)_3SiMe_2Hex$, where Me denotes methyl and Hex denotes $CH_2=CHCH_2CH_2CH_2CH_2-$. was prepared according to U.S. Pat. No. 4,609,574 by mixing cyclopolydimethylsiloxanes hydrolyzate of 5-hexenylmethyldichlorosilane, 5-hexenylendblocked polydimethylsiloxane fluid, and KOH in a flask and heating to 150° C. for 5 hours. After cooling, the mixture was treated with carbon dioxide for 30 minutes to neutralize the KOH. Fuller's Earth (5 g) was added and after 24 hours, the mixture was filtered to yield the copolymer.

U.S. Pat. No. 4,609,574 is incorporated herein by reference to disclose the details of how to prepare the copolymer delineated immediately above, and other 5-hexenyl-substituted silicon compounds such as 5-hexenylmethyldichlorosilane and 5-hexenyldimethylchlorosilane and other polymers, such as 5-hexenyl-endblocked polydimethylsiloxane fluid and the hydrolyzate of 5-hexenylmethyldichlorosilane.

EXAMPLE 1 to 10

Each of ten paper coating composition of this invention (Compositions 1 to 10) was prepared by mixing 10 g of the 5-hexenylendblocked copolymer of dimethylsiloxane units and 5-hexenylmethylsiloxane units, noted above, 0.19 g of a platinum catalyst (a soluble platinum complex containing 0.67% platinum formed from chloroplatinic acid and divinyltetramethyldisiloxane), a diorgano fumarate cure control additive (See Table I-Inhibitor), and 0.37 g of a methylhydrogenpolysiloxane crosslinker (a mixture containing 60% of trimethylsiloxane-endblocked polymethylhydrogensiloxane with an average of about 35 siloxane units per polymer molecule and 40% of trimethyl-endblocked copolymer with an average of 3 dimethylsiloxane units and 5 methylhydrogensiloxane units per copolymer molecule).

For comparison, eight paper coating compositions (Compositions a to h) were identically prepared except containing the corresponding maleates instead of fumarates.

The bath life (at 25° or 40° C.) and cure time (at 180° F. = 82.2° C.) of each of the example coatings and comparison coatings were determined by the procedures noted above and the results are summarized in Table I. These examples illustrate the utility of the compositions of this invention as easily curable coating compositions which have useful bath lives. These examples, when considered with the disclosed comparison examples, also show the improved cure characteristics of the compositions of this invention, with respect to cure time and maintenance of cure time as the composition ages at room temperature and the viscosity increases, when the fumarate cure control additive is a diethyl or diallyl fumarate.

TABLE I

COMPOSITIONS CONTAINING HEXENYL POLYMER

| COMP. | INHIBITOR IDENT* | PPT | BATH-LIFE, HR. 25° C. | BATH-LIFE, HR. 40° C. | CURE-TIME, SEC. INITIAL | CURE-TIME, SEC. 2 × VISCOSITY |
|---|---|---|---|---|---|---|
| 1. | DAF | 5 | | 0.5 | 25 | 50 |
| 2. | " | 10 | 94.5 | — | 20 | |
| 3. | " | 15 | | 95 | 40 | |
| 4. | " | 20 | | 119 | 40 | 80 |
| a. | DAM | 5 | | 23 | 45 | 120 |
| b. | " | 10 | | 100–166 | 60 | |
| 5. | DEF | 20 | | 2 | 15 | |
| 6. | " | " | 24 | — | 20 | 65 |
| c. | DEM | 20 | | 44 | 30 | 180 |
| 7. | MEF | 4 | | 1 | 40 | |
| 8. | " | 10 | | 0.6 | 90 | 120 |
| d. | MEM | 4 | | 3.25 | 45 | |
| e. | " | 5 | | 2.7 | 60 | 105 |
| f. | " | " | | — | 30 | |
| 9. | MIF | 10 | | 0.3 | 45 | |
| 10. | " | 20 | | 0.8 | 180 | 240 |
| g. | MIM | 10 | 72 | 5 | 40 | 40 |
| h. | " | " | | 1–23 | 90 | |

*DAF = Diallyl fumarate.
DAM = Diallyl maleate.
DEF = Diethyl fumarate.
DEM = Diethyl maleate.
MEF = Methoxyethyl fumarate.
MEM = Methoxyethyl maleate.
MIF = Methoxyisopropyl fumarate.
MIM = Methoxyisopropyl maleate.
PPT = Parts per thousand parts of hexenyl-substituted polymer.

TABLE II

COMPOSITIONS CONTAINING VINYL POLYMER

| COMP. | INHIBITOR IDENT* | PPT | BATH-LIFE, HR. 25° C. | CURE-TIME, SEC. INITIAL | CURE-TIME, SEC. 2 × VISCOSITY |
|---|---|---|---|---|---|
| 11. | DAF | 10 | 6–21 | 105 | |
| i. | DAM | 10 | 100–166 | 165 | |
| 12. | DEF | 20 | 22.5 | 50 | |
| 13. | " | " | 2.75 | | |
| 14. | " | " | 48 | — | 50 |
| 15. | " | " | 7 | — | 50 |
| j. | DEM | 20 | 70 | 180 | |
| 16. | MIF | 4 | 1.25 | 50 | |
| 17. | " | 10 | 0.75 | 90 | |
| 18. | " | " | 0.5 | 150 | 210 |
| 19. | " | 20 | 1.25 | 180 | 240 |
| k. | MIM | 4 | 2.5 | 30 | 105 |
| l. | " | 5 | 5.1 | 120 | 195 |
| m. | " | 10 | 1–23 | 165 | |
| n. | " | " | 8 | 75 | |

*DAF = Diallyl fumarate.
DAM = Diallyl maleate.
DEF = Diethyl fumarate.
DEM = Diethyl maleate.
MIF = Methoxyisopropyl fumarate.
MIM = Methoxyisopropyl maleate.
PPT = Parts per thousand parts of vinyl-substituted polymer.

EXAMPLES 11 to 19

Nine paper coating composition of this invention (Compositions 11 to 19) were prepared by mixing 10 g of a vinyl-endblocked copolymer of dimethylsiloxane units and vinylmethylsiloxane units having the average formula ViMe$_2$SiO(Me$_2$SiO)$_{151}$(MeViSiO)$_3$SiMe$_2$Vi where Me denotes methyl and Vi denotes CH$_2$=CH- (prepared by mixing cyclopolydimethylsiloxanes, cyclopolymethylvinylsiloxanes, vinyl-endblocked polydimethylsiloxane fluid, and KOH in a flask and heating as was done for the hexenyl-substituted polymer noted above), 0.19 g of the platinum catalyst of Examples 1 to 10, a diorgano fumarate cure control additive (See Table II-Inhibitor), and 0.37 g of the methylhydrogenpolysiloxane crosslinker of Examples 1 to 10.

For comparison, six paper coating compositions (Compositions i to n) were identically prepared, except containing the corresponding maleates instead of fumarates.

The bath life (at 25° or 40° C.) and cure time (at 180° F. = 82.2° C.) of each of the example coatings and comparison coatings were determined by the procedures noted above and the results are summarized in Table II. These examples illustrate the utility of the compositions of this invention as easily curable coating compositions which have useful bath lives. These examples, when considered with the disclosed comparison examples, also show the improved cure characteristics of the compositions of this invention, with respect to cure time and maintenance of cure time as the composition ages at room temperature and the viscosity increases, when the fumarate cure control additive is a diethyl fumarate.

EXAMPLE 20

This example is presented to illustrate the slower reaction of the 5-hexenylsilyl unit toward SiH in the presence of diethyl fumarate compared to the same reaction mixture containing no added inhibitor. In this experiment model compounds, instead of polymers, were used so that the rate of the reaction could be monitored more easily.

The reactivity rates were compared by glc chromatograph analysis of mixtures of one-mol portions of HexMe$_2$SiCl and Me$_3$SiOMeHSiOSiMe$_3$, where Hex denotes the 5-hexenyl radical and Me denotes the methyl radical. The mixtures contained 7 mg Pt per mol of SiH compound. Platinum was added as a soluble complex of chloroplatinic acid and divinyltetramethyldisiloxane.

When the reaction was conducted at 60° C. in the absence of an inhibitor for the platinum catalyst 80% of the HexMe$_2$SiCl was hydrosilylated in 10 minutes. Contrastingly, when the reaction was conducted in the presence of a one-mol portion of diethyl fumarate at 75° C. only 22% of the HexMe$_2$SiCl, and substantially none of the fumarate, was hydrosilylated in 30 minutes.

When diethyl fumarate alone was reacted with Me$_3$SiOMeHSiOSiMe$_3$ in the presence of the platinum catalyst at 100° C. 15% and 62% thereof was hydrosilylated in 30 minutes and in 3 hours, respectively. Contrastingly, diethyl maleate undergoes only 44% hydrosilylation in 3 hours.

EXAMPLE 21

This example is presented to illustrate the utility of the composition and method of this invention. S2S kraft paper was coated with the composition of Example 6 and the applied coating was heated to 82° C. (180° F.) for 30 seconds to fully cure the coating.

The cured coating was immediately laminated with an acrylic adhesive (GMS-263; Monsanto, St. Louis, Mo.). The adhesive solution was applied to the coating at a wet thickness of 3 mils using a drawdown bar. The applied adhesive was air-dried at room temperature for one minute, heated at 70° C. for one minute and the cooled to room temperature for one minute. A sheet of 60 pound matte litho was applied to the dried adhesive and the resulting laminate was pressed with a 4.5 pound rubber-coated roller. The test laminate was then aged at room temperature and at 70° C. and cut into 1 inch strips.

Adhesive release testing was done by pulling the substrate/coating from the matte/adhesive at an angle of 180 degrees and at a rate of 12 78, 400 and 4000 inches per minute. The force needed to separate the adhesive/coating interface was noted several times during the separation and adhesive release was noted as an average of the several readings.

The release values were 40.5, 83.5, 113 and 109 g/in for pull speeds of 12, 78, 400 and 4000 in/min, respectively. This example show that a composition of this invention having a pot life of 24 hours at room temperature can be rapidly cured at a moderate temperature to such an extent that the resulting coating not only does not experience acrylic weld with an adhesive applied in an in-line fashion, but will provide what is regarded as a premium release level, i.e., 100 g/in. Slightly higher release levels were obtained when the coating was cured at 150° F. for 60 seconds and identically laminated, aged and pulled.

When this test was performed with polyethylene coated paper, instead of S2S kraft, the coating needed 90 seconds at 150° F. to achieve full cure; however, the acrylic adhesive was released without acrylic weld and at premium levels.

That which is claimed is:

1. A curable composition comprising
   (A) an organosilicon compound having an average of from one to three silicon-bonded monovalent radicals per silicon atom selected from the group consisting of hydrocarbon and halohydrocarbon radicals, an average of at least two of said monovalent radicals, per molecule of Component (A), being olefinic hydrocarbon radicals, the remaining silicon valences thereof being satisfied by divalent radicals free of aliphatic unsaturation selected from the group consisting of oxygen atoms, hydrocarbon radicals, hydrocarbon ether radicals, halohydrocarbon ether radicals and halohydrocarbon radicals, said divalent radicals linking silicon atoms,
   (B) an organohydrogensilicon compound containing at least two silicon-bonded hydrogen atoms per molecule thereof and an average of from one to two silicon-bonded monovalent radicals free of aliphatic unsaturation, per silicon atom, selected from the group consisting of hydrocarbon and halohydrocarbon radicals, the remaining silicon valences thereof being satisfied by divalent radicals free of aliphatic unsaturation selected from the group consisting of oxygen atoms, hydrocarbon radicals, hydrocarbon ether radicals, halohydrocarbon ether radicals and halohydrocarbon radicals, said divalent radicals linking silicon atoms,
   (C) an amount of a platinum-containing catalyst sufficient to accelerate a reaction of said silicon-bonded olefinic hydrocarbon radicals with said silicon-bonded hydrogen atoms at room temperature and
   (D) an amount of an inhibitor compound for the platinum-containing catalyst sufficient to retard said reaction at room temperature but insufficient to prevent said reaction at elevated temperature, said inhibitor compound having the formula

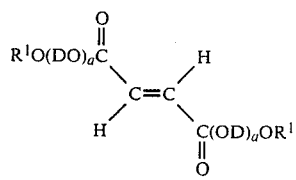

wherein each $R^1$ denotes, independently, a monovalent hydrocarbon radical having from 1 to 6 carbon atoms, each D denotes, independently, an alkylene radical having from 2 to 4 carbon atoms and each a has an average value of 0 or 1. the amounts of Components (A) and (B) being sufficient to provide a ratio of the number of silicon-bonded hydrogen atoms to the number of silicon-bonded olefinic hydrocarbon radicals of from 1/100 to 100/1.

2. A composition in accordance with claim 1 wherein
   Component (A) is an organopolysiloxane having the average unit formula $R_c^2SiO_{(4-c)/2}$ wherein $R^2$ denotes said monovalent radicals and c has a value of from 1 to 3 and
   Component (B) is an organohydrogenpolysiloxane having the average unit formula $R_e^3H_fSiO_{(4-e-f)/2}$ wherein $R^3$ denotes said monovalent radical free of aliphatic unsaturation, f has a value of from greater than 0 to 1 and the sum of e plus f has a value of from 1 to 2.

3. A composition in accordance with claim 2 wherein Component (A) has the formula

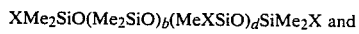

and Component (D) has the formula

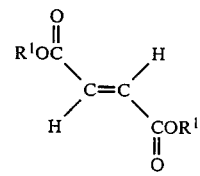

wherein Me denotes methyl, X denotes a monovalent radical selected from the group consisting of olefinioc hydrocarbon radicals having from 2 to 12 carbon atoms and R radicals, an average of at least two X radicals per molecule of Component (A) being olefinic hydrocarbon radicals, R denotes a monovalent hydrocarbon or halohydrocarbon radical free of aliphatic unsaturation having from 1 to 20 carbon atoms, b and d have average values of zero or more, and the sum of b plus d has a value sufficient to provide a viscosity at 25° C. of at least 25 millipascal-seconds for the Component (A).

4. A composition in accordance with claim 3 wherein Component (A) has the formula

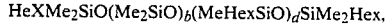

wherin Hex denotes $CH_2=CHCH_2CH_2CH_2CH_2-$, Component (B) has the formula

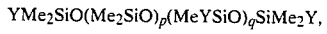

wherein Y denotes a hydrogen atom or Me, an average of at least two Y radicals per molecule of Component (B) being hydrogen atoms, p and q have average values of zero or more, the sum of p plus q has a value sufficient to provide a viscosity at 25° C. of from 1 to 100 millipascal-seconds for the Component (B), Component (C) comprises a vinylsiloxane complex of chloroplatinic acid and Component (D) is diallyl fumarate.

5. A composition in accordance with claim 3 wherein Component (A) has the formula ViMe$_2$SiO(Me$_2$SiO)$_b$(MeViSiO)$_d$SiMe$_2$Vi, wherein Vi denotes CH$_2$=CH-.

Component (B) has the formula

YMe$_2$SiO(Me$_2$SiO)$_p$(MeYSiO)$_q$SiMe$_2$Y, wherein Y denotes a hydrogen atom or Me, an average of at least two Y radicals per molecule of Component (B) being hydrogen atoms, p and q have average values of zero or more, the sum of p plus q has a value sufficient to provide a viscosity at 25° C. of from 1 to 100 millipascal-seconds for the Component (B), Component (C) comprises a vinylsiloxane complex of chloroplatinic acid and Component (D) is diethyl fumarate.

6. A process for rendering a solid surface of a substrate less adherent to materials that normally adhere thereto, said process comprising (I) applying to said solid surface a coating of a liquid curable composition comprising (A) an organopolysiloxane compound having the formula XMe$_2$SiO(Me$_2$SiO)$_b$(MeXSiO)$_d$SiMe$_2$X, wherein Me denotes methyl, X denotes a monovalent radical selected from the group consisting of olefinic hydrocarbon radicals having from 2 to 12 carbon atoms and R radicals, an average of at least two X radicals per molecule of Component (A) being olefinic hydrocarbon radicals, R denotes a monovalent hydrocarbon or halohydrocarbon radical free of aliphatic unsaturation having from 1 to 20 carbon atoms, b and d have average values of zero or more, and the sum of b plus d has a value sufficient to provide a viscosity at 25° C. of at least 25 millipascal-seconds for the Component (A).

(B) an organohydrogenpolysiloxane compound bearing at least two silicon-bonded hydrogen atoms per molecule thereof and having the average unit formula R$_e^3$H$_f$SiO$_{(4-e-f)/2}$ wherein R$^3$ denotes a monovalent hydrocarbon or halohydrocarbon radical free of aliphatic unsaturation, f has a value of from greater than 0 to 1 and the sum of e plus f has a value of from 1 to 2.

(C) an amount of a platinum-containing catalyst sufficient to accelerate a reaction of said silicon-bonded olefinic hydrocarbon radicals with said silicon-bonded hydrogen atoms at room temperature, and (D) an amount of an inhibitor component having the formula $$\begin{array}{c} \text{R}^1\text{O(DO)}_a\overset{\overset{\text{O}}{\|}}{\text{C}} \\ \diagdown \\ \text{H} \end{array} \text{C=C} \begin{array}{c} \text{H} \\ \diagdown \\ \underset{\underset{\text{O}}{\|}}{\text{C(OD)}_a\text{OR}^1} \end{array}$$

wherein R$^1$ denotes a monovalent hydrocarbon radical having from 1 to 6 carbon atoms, each D denotes, independently, an alkylene radical having from 2 to 4 carbon atoms and each a has an average value of 0 or 1; the amounts of Components (A) and (B) being sufficient to provide a ratio of the number of silicon-bonded hydrogen atoms to the number of silicon-bonded olefinic hydrocarbon radicals of from ½ to 1.5/1, and (II) heating the applied coating for a period of time sufficient to cure the applied coating.

7. A process according to claim 6 wherein the substrate is a flexible sheet material.

8. A process according to claim 7 further comprising (III) applying a pressure sensitive adhesive composition to the cured applied coating.

9. A process according to claim 7 wherein the flexible sheet material is paper.

* * * * *